Patented Dec. 5, 1944

2,364,304

UNITED STATES PATENT OFFICE 2,364,304

α-PYRONE CARBOXYLIC ACID AMIDES AND THEIR MANUFACTURE

Henry Martin, Basel, Walter Baumann, Arlesheim, near Basel, Hans Zaeslin, Riehen, near Basel, and Hans Gysin, Basel, Switzerland, assignors to the firm of J. R. Geigy A. G., Basel, Switzerland No Drawing. Application December 20, 1940, Serial No. 371,055. In Switzerland December 20, 1939

9 Claims. (Cl. 260—344)

It has surprisingly been found that the α-pyrone carboxylic acid amides unknown hitherto possess remarkable properties which render them valuable for therapeutical purposes. The said new compounds are obtained by causing α-pyrone carboxylic acid, or substitution products thereof or functional derivatives of both, such as salts, halides, esters, anhydrides and so on to react on secondary amines, their salts or carbamic acid halides in the presence or absence of solvents, condensation or acid-binding agents.

As condensation agents there may preferably be used phosphorus halides, phosphorus pentoxide, thionylchloride, phosgene and the like.

The new compounds can be used as intermediate products in the production of pharmaceutical preparations; some of them are also therapeutically valuable as they possess good analeptic properties with low toxicity. The α-pyrone carboxylic acid amides unknown hitherto are, in part, very easily soluble in water and, in part, soluble in alcohol, ether, glycolether, propylene glycol, etc.

The present invention is illustrated in the following examples, the parts being by weight unless otherwise stated.

Example 1

40 parts by weight of 4:6-dimethyl-α-pyrone-5-carboxylic acid chloride (boiling point 12 mm. 138–140° C.) made from the corresponding carboxylic acid with thionyl chloride, are dissolved in 300 parts by volume of absolute ether and there is added thereto in drops, while stirring and cooling, at 0–10° C. a solution of 40 parts by weight of diethylamine in 300 parts by volume of absolute ether. Then it is allowed to rise to room temperature whereupon it is heated for 2 hours to 25–30° C. The separated diethylamine hydrochloride is filtered by suction and the ethereal solution is treated with saturated potash solution. Thereupon it is dried over calcined sodium sulphate. After expelling the ether, the 4:6-dimethyl-α-pyrone-5-carboxylic acid diethylamide is distilled at 0.1 mm. and 145° C., melting point 50° C. It is easily soluble in water. The same compound is obtained also in a very good yield by heating 4:6-dimethyl-α-pyrone-5-carboxylic acid diethylamine with phosphorus pentoxide to 130° C.

In the same manner it is possible to produce 4:6-dimethyl-α-pyrone-5-carboxylic acid dipropylamide, boiling point $10^{-4}$ mm. 120–130° C. 4:6-dimethyl-α-pyrone-5-carboxylic acid diallylamide, boiling point $10^{-4}$ mm. 125–130° C. and 4:6-dimethyl-α-pyrone-5-carboxylic acid dimethylamide, boiling point 1 mm. 158° C.

Example 2

20 parts by weight of piperidine are dissolved in 150 parts by volume of absolute ether (or carbon tetrachloride) and at 0–10° C. there is added in drops a solution of 4:6-dimethyl-α-pyrone-5-carboxylic acid chloride in 150 parts by volume of dry ether, then the mixture is stirred for still 2 hours at room temperature. The new piperidide is difficultly soluble in ether and therefore precipitates together with the piperidine hydrochloride. The precipitate is filtered with suction and the hydrochloride is removed therefrom by means of dry acetone. The residue is dissolved in absolute benzene and the water-soluble 4:6-dimethyl-α-pyrone-5-carboxylic acid piperidide is precipitated therefrom by means of petroleum ether, melting point 111–112° C.

It is possible to produce 4:6-dimethyl-α-pyrone-5-carboxylic acid morpholide in the same manner, melting point 148–149° C. By using lupetidine there results a similar compound.

Example 3

30 parts of α-pyrone-5-carboxylic acid are heated with 60 parts of thionyl chloride until a complete solution is formed. After eliminating the excess of thionyl chloride by suction in vacuo the acid chloride is distilled; boiling point 0.5 mm. 90–93° C.

15.8 parts of α-pyrone-5-carboxylic acid chloride are dissolved in 400 parts by volume of absolute ether and while thoroughly cooling there are added in drops 18 parts of diethylamine. After some time the separated hydrochloride is filtered off, the solvent expelled and the water-soluble α-pyrone-5-carboxylic acid diethylamide is distilled; boiling point 0.35 mm. 100–105° C.

Example 4

100 parts of 4:6-dimethyl-α-pyrone-5-carboxylic acid ethyl ester (or corresponding quantities of the methyl ester) are reacted in the autoclave at 170° C. with 146 parts of diethylamine. The resulting product is fractionated, whereby the main portion passes over at 1 mm. between 150–165° C. Traces of unchanged ester are removed by pouring into water, extraction with a little ether and saturating the aqueous solution with potash. After separating the aqueous portion, entirely pure 4:6-dimethyl-α-pyrone-5-carboxylic acid diethylamide is obtained by distillation.

Example 5

15 parts of the sodium salt (or of the potassium salt) of 4:6-dimethyl-α-pyrone-5-carboxylic acid are heated with an excess of diethyl carbamic acid chloride up to 150° C. While developing carbonic acid there occurs a vigorous conversion into 4:6-dimethyl-α-pyrone-5-carboxylic acid diethylamide. This is worked up in a similar way to Example 1.

Example 6

25 parts of methylaniline are dissolved in 250 parts by volume of dry ether and an ethereal solution of 9.5 parts of 4:6-dimethyl-α-pyrone-5-carboxylic acid chloride or bromide is slowly added thereto. After 3 hours, the deposit, which in addition to methylaniline hydrochloride also contains the new methylanilide, is drawn off. The 4:6-dimethyl-α-pyrone-5-carboxylic acid-N-methylanilide is re-crystallised from hot water. Melting point 140–141° C.

Instead of the excess of organic base there may also be used anhydrous carbonates, such as for example sodium carbonate, as acid binding agent.

The corresponding 4:6-dimethyl-α-pyrone-5-carboxylic acid-N-ethylanilide melts at 141–142° C. The N-benzylanilide is also obtained according to the above process in good yield.

Example 7

25 parts of α-pipecoline are dissolved in 200 parts by volume of absolute ether (chloroform or benzene) and an ethereal solution of 9.5 parts of 4:6-dimethyl-α-pyrone-5-carboxylic acid chloride is added thereto at 0–10° C. After 2 hours the pipecoline hydrochloride is sucked off and the ethereal solution is shaken with a saturated potash solution. After drying with calcinated sodium sulphate the solvent is expelled. There remains behind a bright crystal powder. It is sublimated in vacuo (10⁻⁴ mm.) at 110–115° C., re-crystallised from a benzene-ether-mixture and melts at 120–124° C. It is well soluble in hot water.

What we claim is:

1. A process for the manufacture of α-pyrone carboxylic acid amides, comprising reacting a compound of the following general formula

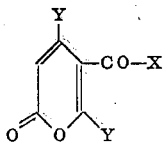

wherein each Y means a member of the group consisting of H and $CH_3$ and X means a member of the group consisting of OH, O-metal, halogen and O.alkyl, with an amine selected from the group consisting of secondary amines containing no elements other than oxygen, hydrogen, nitrogen and carbon atoms, and in which the oxygen, when present, is cyclically bound, their salts and their carbamic acid halogenides.

2. A process for the manufacture of α-pyrone carboxylic acid amides, comprising reacting a compound of the following general formula

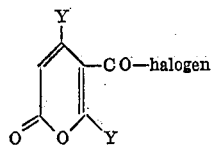

where each Y means a member of the group consisting of H and $CH_3$, with a secondary aliphatic amine containing no elements other than oxygen, hydrogen, nitrogen and carbon atoms, and in which the oxygen, when present, is cyclically bound.

3. A process for the manufacture of an α-pyrone-5-carboxylic acid amide, comprising reacting 4:6-dimethyl-α-pyrone-5-carboxylic acid chloride with diethylamine.

4. A process for the manufacture of an α-pyrone-5-carboxylic acid amide, comprising reacting 4:6-dimethyl-α-pyrone-5-carboxylic acid chloride with diallylamine.

5. The α-pyrone-5-carboxylic acid amide of the following formula

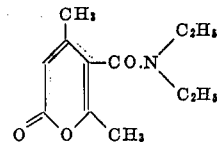

said amide being a colorless, water-soluble compound of excellent analeptic properties.

6. The α-pyrone-5-carboxylic acid amide of the following formula

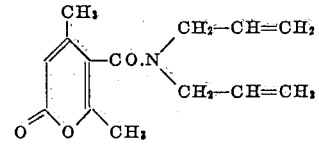

said amide being a colorless, water-soluble compound of excellent analeptic properties.

7. An α-pyrone-5-carboxylic acid amide selected from the group consisting of compounds of the formula

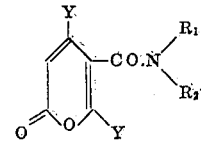

and of compounds of the formula

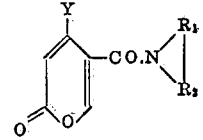

wherein each Y represents a member of the group consisting of H and $CH_3$, $R_1$ and $R_2$ severally represent a monovalent radical selected from the group consisting of saturated and unsaturated aliphatic hydrocarbon radicals and aromatic mononuclear radicals of the benzene series, said monovalent radical containing no elements other than carbon and hydrogen, and

represents a divalent saturated aliphatic radical containing no elements other than oxygen, hydrogen and carbon, the oxygen when present being cyclically bound.

8. An α-pyrone-5-carboxylic acid made of the formula

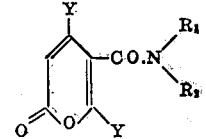

wherein each Y represents a member of the group consisting of H and CH₃, and R₁ and R₂ each represents a monovalent saturated aliphatic hydrocarbon radical containing no elements other than carbon and hydrogen.

9. An α-pyrone-5-carboxylic acid amide of the formula

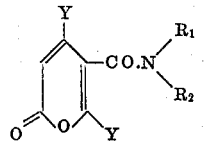

wherein each Y represents a member of the group consisting of H and CH₃, and R₁ and R₂ each represents a monovalent unsaturated aliphatic hydrocarbon radical containing no elements other than carbon and hydrogen.

HENRY MARTIN.
WALTER BAUMANN.
HANS ZAESLIN.
HANS GYSIN.